(No Model.)
W. O. NIGHTENGALE.
PIPE TONGS.
No. 441,017. Patented Nov. 18, 1890.
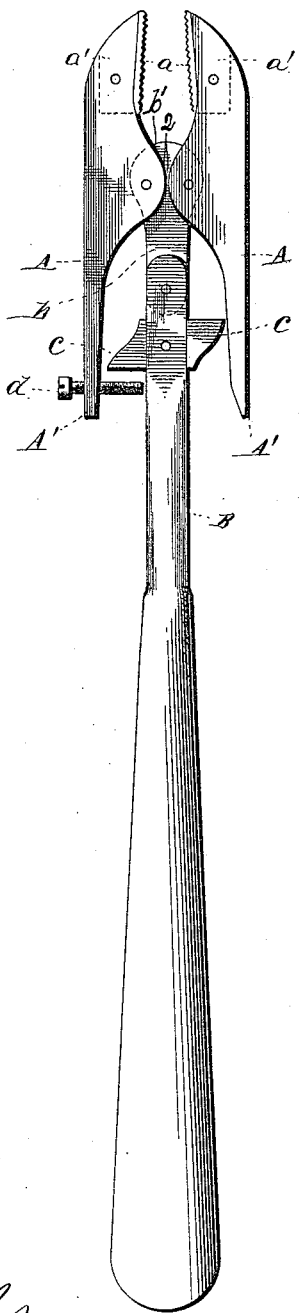
WITNESSES
INVENTOR
W. O. Nightengale,
by E. W. Anderson
his Attorney

UNITED STATES PATENT OFFICE.

WILLIAM O. NIGHTENGALE, OF JOHNSTOWN, PENNSYLVANIA, ASSIGNOR OF ONE-HALF TO WILLIAM HENRY LEE AND WILFRED HENRY JACKSON, OF SAME PLACE.

PIPE-TONGS.

SPECIFICATION forming part of Letters Patent No. 441,017, dated November 18, 1890.

Application filed April 12, 1890. Serial No. 347,636. (No model.)

*To all whom it may concern:*

Be it known that I, WILLIAM O. NIGHTENGALE, a citizen of the United States, and a resident of Johnstown, in the county of Cambria and State of Pennsylvania, have invented certain new and useful Improvements in Pipe-Tongs; and I do declare the following to be a full, clear, and exact description of the invention, such as will enable others skilled in the art to which it appertains to make and use the same, reference being had to the accompanying drawings, and to letters and figures of reference marked thereon, which form a part of this specification.

Figure 1 of the drawings is a side view, and Figs. 2 and 3 are detail views.

This invention pertains to certain improvements in pipe tongs or wrenches; and it consists in the construction and novel combination of parts, as will hereinafter fully appear from the following description and accompanying illustrations.

In the drawings, A A refer to two jaws provided at their gripping ends with serrated or roughened face plates or bearings $a\ a$, which may be removable, having ribs $a$ upon their rear portions engaging grooves or sockets $a^2$ in the opposite surfaces of said jaws, wherein they are held by bolts or pins. This removable construction permits the ready removal of the serrated or bearing plates when worn so as to be effective no longer.

The jaws A are pivoted a short distance inward from the bearing or face plates to one end of a toggle-piece or link $b$, the pivot of said jaws having an interval at 2 between them. To the opposite end of the toggle-piece is pivoted the inner end of the lever B, which may be bifurcated to receive the end of said toggle-piece or link. It will be observed that the forward end of the toggle-piece or link $b$ extends, as at $b'$, a short distance into the pipe or object receiving space between the jaws A, so that in conjunction with longitudinal or forward movement of the jaws and link or toggle-piece it will be caused to engage and force the pipe or object, when interposed between the jaws, forward toward the outer or converging ends of the latter and thus aid to effectively grip the pipe or object. The lever B is armed just in rear of its connection with said toggle or link $b$ with oppositely-beveled cam projections $c$, which are adapted to act upon the rearwardly-extending portions or arms A' of the jaws A as the lever is turned in angular relation thereto. The lever is thus, through the link or toggle-piece and the cam projections, enabled to exert a compound action upon the jaws, effecting the gripping of the pipe placed between said jaws with suitable force to effectively hold it against turning, as required in uniting pipe-sections.

In order to prevent mashing the pipe by undue compression, a pressure-regulating screw $d$ is provided in the rear end of the arm A', which is adapted to limit the movement of the lever B, the pressure of the jaws being regulated to suit the diameter of the pipe by varying the extent of the projection of the screw. The pivoted centers of the jaws being separated from each other, as shown, provide for a longitudinal motion of said jaws when relieved from the pressure of the lever, which readily clears them from the pipe, so that there is no adherence thereto.

Having described this invention, what I claim, and desire to secure by Letters Patent, is—

The pipe-tongs consisting of the hand-lever B, carrying at its outer end fixed oppositely-beveled cam projections, a link or toggle pivoted to said hand-lever at one end, jaws separately pivoted to said link at the other end and engaged by the cam projections, substantially as described, whereby a longitudinal reciprocating motion is imparted to said jaws by the oscillation of the handle.

In testimony whereof I affix my signature in presence of two witnesses.

WILLIAM O. NIGHTENGALE.

Witnesses:
PHILIP C. MASI,
CHAS. L. TAYLOR.